(12) United States Patent
French et al.

(10) Patent No.: US 9,892,274 B2
(45) Date of Patent: *Feb. 13, 2018

(54) ACCESSING AND PROVIDING ACCESS TO COMPUTER FILES OVER A COMPUTER NETWORK

(71) Applicant: International Business Machines Corporation, Armonk, NY (US)

(72) Inventors: Steven M. French, Austin, TX (US); Venkateswararao Jujjuri, Beaverton, OR (US); Anthony N. Liguori, Austin, TX (US); Badari Pulavarty, Beaverton, OR (US); Eric V. Van Hensbergen, Austin, TX (US); Aneesh K. Veetil, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,167

(22) Filed: Nov. 26, 2014

(65) Prior Publication Data
US 2015/0088935 A1    Mar. 26, 2015

Related U.S. Application Data

(63) Continuation of application No. 12/911,644, filed on Oct. 25, 2010, now Pat. No. 8,930,401.

(51) Int. Cl.
*G06F 7/00* (2006.01)
*G06F 17/30* (2006.01)
*G06F 21/62* (2013.01)

(52) U.S. Cl.
CPC .... *G06F 21/6218* (2013.01); *G06F 17/30165* (2013.01); *G06F 17/30194* (2013.01); *G06F 17/30238* (2013.01); *G06F 2213/0038* (2013.01)

(58) Field of Classification Search
CPC ............ G06F 21/6209; G06F 21/6218; G06F 17/3012
See application file for complete search history.

(56) References Cited

U.S. PATENT DOCUMENTS

| | | |
|---|---|---|
| 4,825,354 A | 4/1989 | Agrawal et al. |
| 5,361,359 A | 11/1994 | Tajalli |

(Continued)

OTHER PUBLICATIONS

Non-final office action for U.S. Appl. No. 12/911,644 dated Oct. 30, 2012, 22 pp.

(Continued)

*Primary Examiner* — Marc Somers
(74) *Attorney, Agent, or Firm* — Steven Bennett (57) ABSTRACT

Methods, systems and computer program products are provided that may relate to controlling access to or accessing computer files over a computer network. A file server may execute on a first computer system and a client may execute on a second computer system. The client may be configured to send a first communication to the file server relating to a first computer file stored on the first computer system. The first communication may include first access control data associated with the first computer file. The file server may be configured to receive the first communication and extract the first access control data from the first communication. The file server may then store the extracted first access control data in extended attributes of the first computer file on the first computer system.

12 Claims, 7 Drawing Sheets

(56) References Cited

U.S. PATENT DOCUMENTS

| | | |
|---|---|---|
| 6,665,689 B2 | 12/2003 | Muhlestein |
| 7,158,928 B2 | 1/2007 | Perrin et al. |
| 7,668,880 B1 | 2/2010 | Carroll |
| 7,797,295 B2 | 9/2010 | Bell et al. |
| 7,900,006 B2 | 3/2011 | Nagaraj |
| 8,930,401 B2 | 1/2015 | French et al. |
| 2004/0068516 A1 | 4/2004 | Lee et al. |
| 2005/0149759 A1 | 7/2005 | Vishwanath et al. |
| 2006/0259964 A1 | 11/2006 | Maldonado et al. |
| 2007/0136603 A1 | 6/2007 | Kuecuekyan |
| 2008/0034205 A1 | 2/2008 | Alain et al. |
| 2008/0098455 A1 | 4/2008 | Hirahara |
| 2008/0162762 A1 | 7/2008 | Neiger et al. |
| 2009/0077618 A1 | 3/2009 | Pearce et al. |
| 2009/0132543 A1 | 5/2009 | Chatley et al. |
| 2009/0157694 A1 | 6/2009 | Lee et al. |
| 2009/0199193 A1 | 8/2009 | Jackson |
| 2009/0300071 A1 | 12/2009 | Arcese et al. |
| 2010/0161657 A1 | 6/2010 | Cha et al. |
| 2010/0191888 A1 | 7/2010 | Serebrin et al. |
| 2012/0102079 A1 | 4/2012 | French et al. |

OTHER PUBLICATIONS

Final office action for U.S. Appl. No. 12/911,644 dated Feb. 21, 2013, 21 pp.

Non-final office action for U.S. Appl. No. 12/911,644 dated May 13, 2014, 27 pp.

Notice of allowance for U.S. Appl. No. 12/911,644 dated Sep. 2, 2014, 8 pp.

```
# ls -l
drwx------. 2 virfsuid virtfsgid 2010-05-11 09:19 adir
-rw-------. 1 virfsuid virtfsgid 2010-05-11 09:36 afifo
-rw-------. 2 virfsuid virtfsgid 2010-05-11 09:19 afile
-rw-------. 2 virfsuid virtfsgid 2010-05-11 09:19 alink
-rw-------. 1 virfsuid virtfsgid 2010-05-11 09:57 asocket
-rw-------. 1 virfsuid virtfsgid 2010-05-11 09:32 blkdev
-rw-------. 1 virfsuid virtfsgid 2010-05-11 09:33 chardev
```

SERVER VIEW

```
# ls -l
drwxr-xr-x 2 sally   company_a 2010-05-11 12:19 adir
prw-r--r-- 1 tom     company_a 2010-05-11 12:36 afifo
-rw-r--r-- 2 edward  company_a 2010-05-11 12:19 afile
-rw-r--r-- 2 sally   company_a 2010-05-11 12:19 alink
srwxr-xr-x 1 sally   company_a 2010-05-11 12:57 asocket
brw-r--r-- 1 admin   company_a 2010-05-11 12:32 blkdev
crw-r--r-- 1 admin   company_a 2010-05-11 12:33 chardev
```

CLIENT VIEW

ACCESSING AND PROVIDING ACCESS TO COMPUTER FILES OVER A COMPUTER NETWORK

BACKGROUND

Computer files may have associated access control data that dictates who is permitted to access the computer files and the type of access (e.g., read, write, execute) that should be provided. An example of access control data is an access control list, which is a data structure that is associated with an object such as a computer file, and that provides user and group rights for the object. Many operating systems, such as variants of Unix and Linux, utilize access control lists that are POSIX-compliant. Other operating systems, such as Microsoft Windows®, also utilize access control lists. Access control data associated with a computer file may be stored at the file system level in what are known as "regular file attributes," or simply "regular attributes," of the computer file. Regular attributes may be used by an operating system to, among other things, control access to computer files.

Like regular file attributes, "extended file attributes," or simply "extended attributes," may be used to store data associated with a computer file at the file system level. However, extended attributes are more flexible than regular attributes because they may be used to store all sorts of metadata, whereas regular attributes typically are strictly limited to particular data, such as access control data. For example, some operating systems and other computer programs use extended attributes to store information such as an author, a checksum or a character encoding of a computer file.

A network file system, also referred to as a "distributed file system," enables access to remote computer files. Network file system client computer programs, referred to herein as "network file system clients" or simply as "clients," execute on computer systems and may be provided with access to computer files on other computer systems over a computer network. In some systems, network file system clients interact with network file server computer programs (referred to herein as "network file servers" or as "file servers") over the computer network using a protocol in order to obtain access to remote computer files. Exemplary protocols include the Network File System ("NFS") and Server Message Block ("SMB"), also referred to as the Common Internet File System ("CIFS").

Network file systems typically use server-side access control data to determine whether a network file system client should be permitted access to a computer file. For example, a network file server may store computer files on an underlying host computer system with access control data contained in regular file attributes associated with the computer files. When the network file server receives a file access request from a network file system client, it may utilize access control data contained in the regular file attributes to determine whether the client should be permitted access to the computer file.

BRIEF SUMMARY

Systems, methods and computer program products for providing access to and accessing computer files over a computer network are provided herein. A system may include a file server executing on a first computer system and a client executing on a second computer system. The client may be configured to send a first communication to the file server relating to a first computer file stored on the first computer system, the first communication including first access control data associated with the first computer file. The file server may be configured to receive the first communication, extract the first access control data from the first communication, and store the extracted first access control data in extended attributes of the first computer file on the first computer system.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer non-transitory readable medium(s) having computer readable program code embodied thereon. As used herein, "non-transitory" computer-readable medium(s) include all computer-readable medium(s), with the sole exception being a transitory, propagating signal.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider).

Aspects of the present invention are described below with reference to flowchart illustrations and/or cluster diagrams of methods, apparatus (systems) and computer program products according to embodiments of the invention. It will be understood that each cluster of the flowchart illustrations and/or cluster diagrams, and combinations of clusters in the flowchart illustrations and/or cluster diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or cluster diagram cluster or clusters.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or cluster diagram cluster or clusters.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or cluster diagram cluster or clusters.

Figure 1:
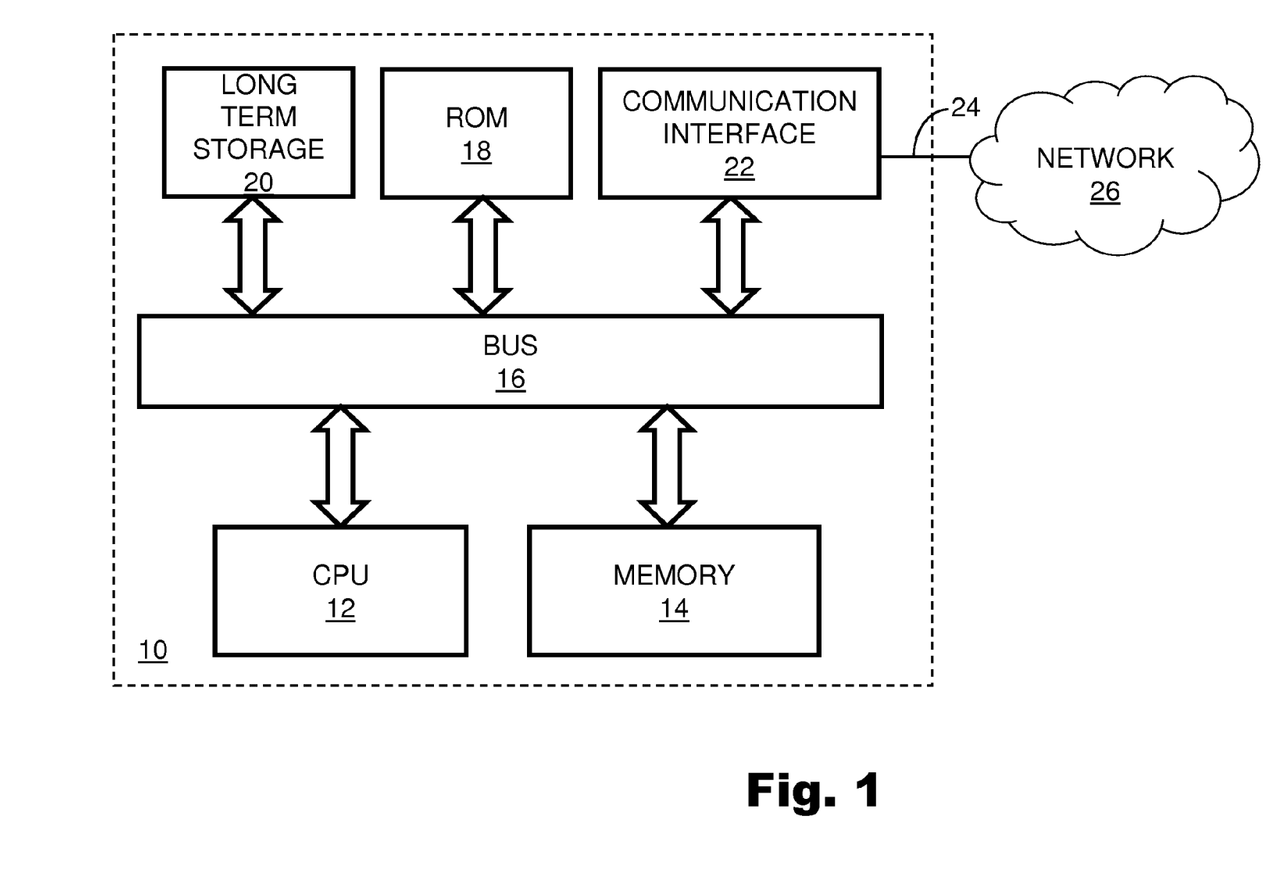
FIG. 1 depicts an exemplary data processing apparatus upon which various methods and computer program products described herein may be implemented.

Referring to FIG. 1, an exemplary data processing apparatus 10 is depicted. Data processing apparatus 10 may be a general or special purpose computer such as a personal computer, a laptop computer, a computer cluster (e.g., a blade system), a web server, a database server, a smart phone, a wireless email device, a tablet computer, a personal digital assistant, a network component (e.g., firewall, router, switch) and so forth. Data processing apparatus 10 may include a central processing unit 12 ("CPU") and memory 14 (e.g., RAM) operably coupled by a bus 16. Data processing apparatus 10 may include additional components, such as ROM 18, long term storage 20 (e.g., hard disk), and one or more communication interfaces 22 through which a connection 24 may be established to communicate with other data processing apparatus over a computer network 26. Communication interface 22 may be various types of network interfaces, such as an Ethernet card, a wireless adapter, and so forth.

Figure 2:
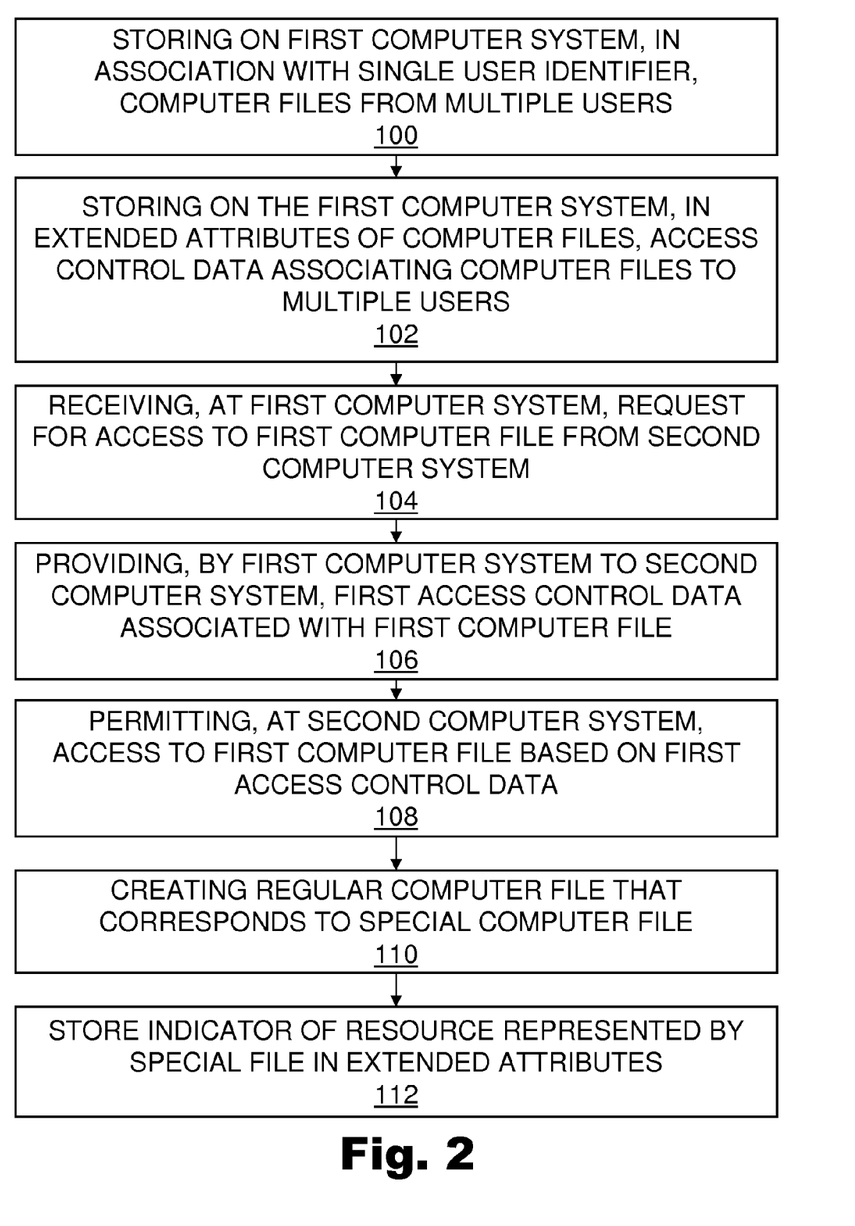
FIG. 2 depicts an exemplary method of making computer files available over a computer network.

FIG. 2 depicts an exemplary method of making computer files available over a computer network. At 100, computer files from multiple users are stored on a first computer system in association with a single user identifier. A user identifier may include one or more computer-readable characters, digits and symbols that are used to identify a particular entity on a computer system. The user identifier may be part of access control data that is stored in regular file attributes of the computer files. In this capacity the user identifier may be used by applications executing on the first computer system, such as the operating system, to assign access rights of computer files to the entity and/or groups of which the entity is a member.

Figure 3:
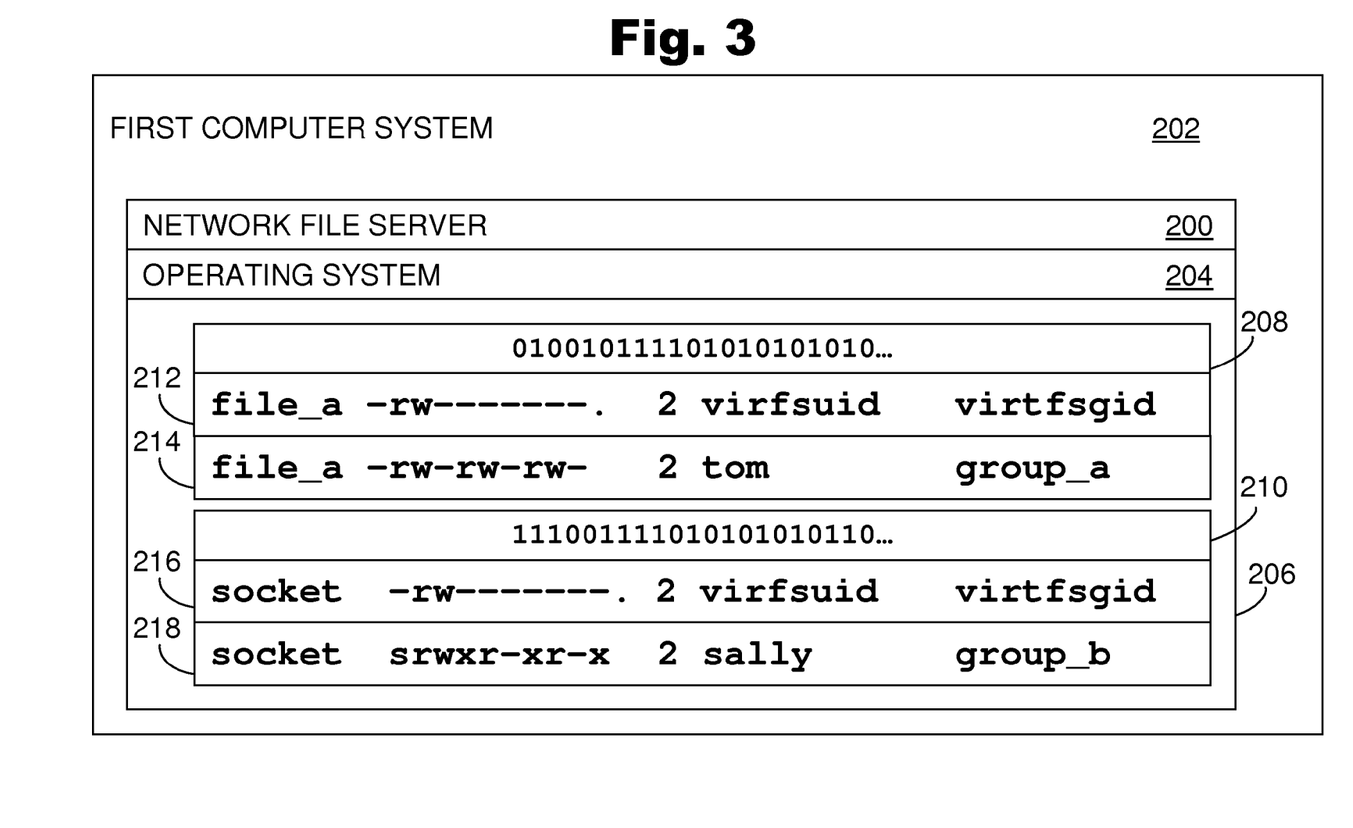
FIG. 3 depicts schematically two exemplary files and associated access control data as it may be stored on in computer file storage available to an exemplary network file server.

An exemplary computer system where multiple computer files from multiple users have been stored in association with a single user identifier is seen in FIG. 3. A network file server 200 is a computer program that executes on a first computer system 202 on top of operating system 204. First computer system 202 includes computer file storage 206 (e.g., hard disk space) that may be where a first computer file 208 (entitled "file_a") and a second computer file 210 (entitled "socket") are stored, typically in a manner dictated by the local file system. Each of the computer files 208 and 210 includes regular attributes 212 and 216, respectively, as well as extended attributes 214 and 218, respectively.

As noted above, regular attributes 212 and 216 may be used by operating system 204 and/or other applications on the first computer system 202 to store access control information that may be used determine what rights users and/or groups have to access to computer files. However, the method of FIG. 2 causes computer files from multiple users to be stored (at 100) in association with a single user identifier. Thus, in this example, the access control data stored in regular file attributes 212 and 216 indicates that first and second computer files 208 and 210 are both stored in association with a single user identifier, "virfsuid," and in association with a single group identifier, "virfsgid." The access control data stored in regular file attributes 212 and 216 also indicates that the entity having the user identifier "virfsuid" has read/write access, but that no one else has any access.

Referring back to FIG. 2, at 102, access control data associating the computer files stored on the first computer system to the multiple users are stored in extended attributes of the computer files. In other words, access control data that is ultimately used to determine whether one or more of the multiple users may access a computer file is stored in extended file attributes.

This is seen in FIG. 3, where extended attributes 214 of first computer file 208 and extended attributes 218 of second computer file 210 are used to store access control data associating the computer files stored in computer file storage 206 to the multiple users. Access control data associated stored in extended attributes 214 indicates that first computer file 208, entitled "file_a," is owned by a user associated with the user identifier "tom" and by the group called "group_a." Access control data stored in its extended attributes 218 indicates that second computer file 210, entitled "socket," is owned by a user associated with the user identifier "sally" and by the group called "group_b."

In addition to allowing for the storage of computer files and access control data, a network file server such as 200 in FIG. 3 also makes existing computer files available for access to clients over a computer network. Referring back to FIG. 2, at 104, the first computer system receives a request for access to a first computer file from a second computer system. The second computer system may be executing a network file system client that allows a user of the second computer system to access computer files over a computer network. At 106, the first computer system provides first access control data associated with the first computer file to a second computer system.

For example, if file server 200 receives a request for access to first computer file 208, file server 200 may include in a responsive communication access control data associated with first computer file 208 that is stored in extended attributes 214 of first computer file 208.

At 108, access to the first computer file is permitted on the second computer system based on access control data provided to the client by the network file server at 106. In this manner, access to computer files in the distributed file system is controlled not by network file servers, but rather by clients of network file servers. Because a network file server does not specifically utilize the access control data stored in extended attributes of computer files, and may not have knowledge thereof, the network file server may be executed in association with a single user identifier. This allows for the file server to store computer files from multiple users in association with the single user identifier, as seen in FIG. 3, where all files are stored in association with the user identifier "virfsuid." Moreover, because the network file server may be associated with a user identifier, in some embodiments, the file server may be executed as an unprivileged process.

Figure 4:
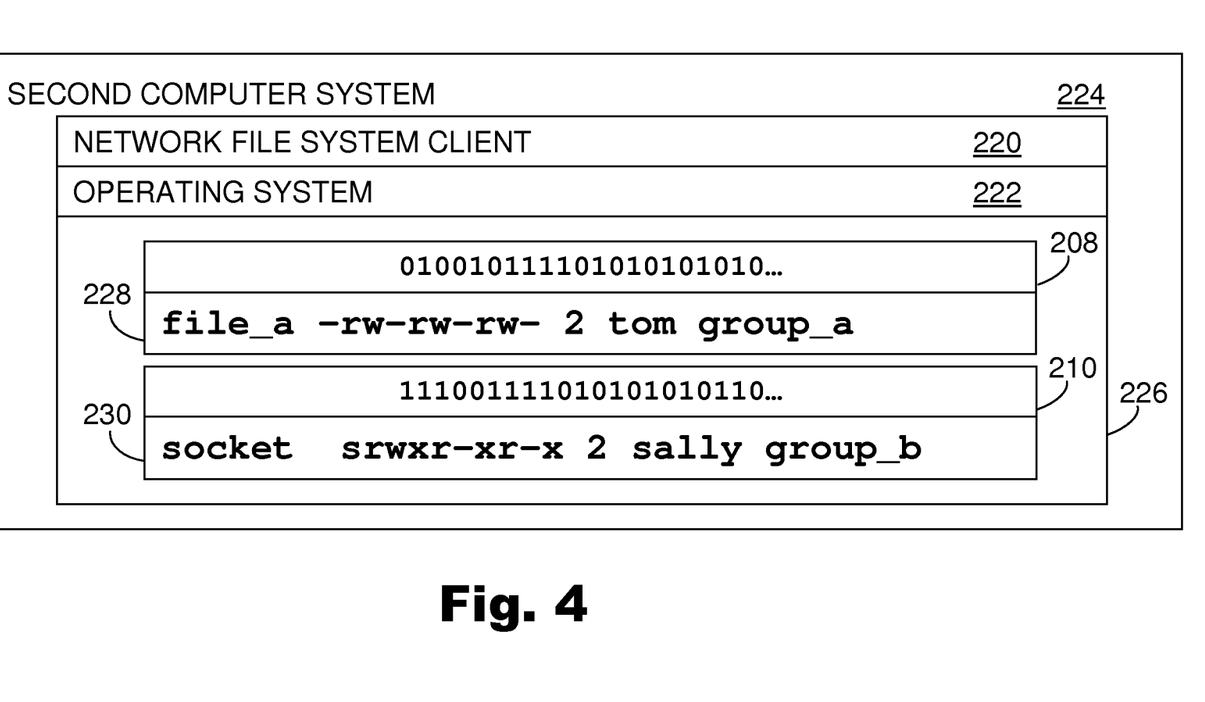
FIG. 4 depicts the exemplary files of FIG. 3 as they may be treated by an exemplary network file system client.

FIG. 4 depicts an exemplary network file system client 220 executing on top of an operating system 222, which in turn executes on a second computer system 224. Network file system client 220 already has requested access (at 104) to first and second computer files 208 and 210 of FIG. 2, and has received access control data provided (at 106) by network file server 200 associated with these computer files. Therefore it can be seen in FIG. 4 that client 220 in FIG. 4 has copies of the first computer file 208 and the second computer file 210 stored in computer file storage 226. However, client 220 does not store access control data relating to these files in extended attributes. Rather, access control data associated with first computer file 208 is stored in the file's regular attributes 228. Likewise, access control data associated with second computer file 210 is stored in the file's regular attributes 230. Computer applications and other processes executing on second computer system 224 that desire access first computer file 208 or second computer file 210 may be permitted such access at 108 based on access control data stored in these regular attributes.

The aforementioned methods and systems may be sufficient for so-called "regular computer files," which are created to store data representing a specific thing in an organized and accessible manner. However, some computer files are created for purposes other than storing data. These computer files are referred to herein as "special computer files." Special computer files may represent resources and/or aspects of a computer system, or they may represent structures created for purposes other than storing data. For example, symbolic links are a type of special computer file that are not created to store data, but rather are created to refer to other computer files. Similarly, device computer files often are used with Unix and its variants (e.g., Linux) to represent devices and allow a user to interact with devices, and more particularly, device drivers, using standard input and output calls. Other types of special computer files include but are not limited to sockets, FIFOs (pipes), and so forth.

Special computer files may not have extended file attributes and may only have regular file attributes. Accordingly, and referring back to FIG. 2, in order for a network file server to store access control data relating to a special file in extended attributes, as described above, the file server may create a regular computer file at 110 that corresponds to a special computer file. The file server may then treat special computer files as regular computer files, which allows for data to be stored in extended attributes of the regular file, as will be described below.

The regular computer file created at 110 may include data that may be provided to a client so that the client is able to treat the special file appropriately. For example, if the special computer file is a symbolic link, a corresponding regular computer file may be created on a network file server that may include a target location of the symbolic link. If the special computer file is a device file, a corresponding regular computer file may be created on the network file server that may include information about the target device or its driver.

At 112 of FIG. 2, an indicator of a type of resource represented by the special computer file may be stored in extended attributes of the regular computer file corresponding to the special file. For example, in FIG. 3, extended attributes 218 of second computer file 210 include an "s" before the read/write/execute indicators that indicates that the second computer file represents a socket. A communication to client 220 from file server 200 relating to second computer file 210 may include this information, which in turn may be stored by client 220 in regular attributes 228 of second computer file 210 (see FIG. 4).

Figure 5:
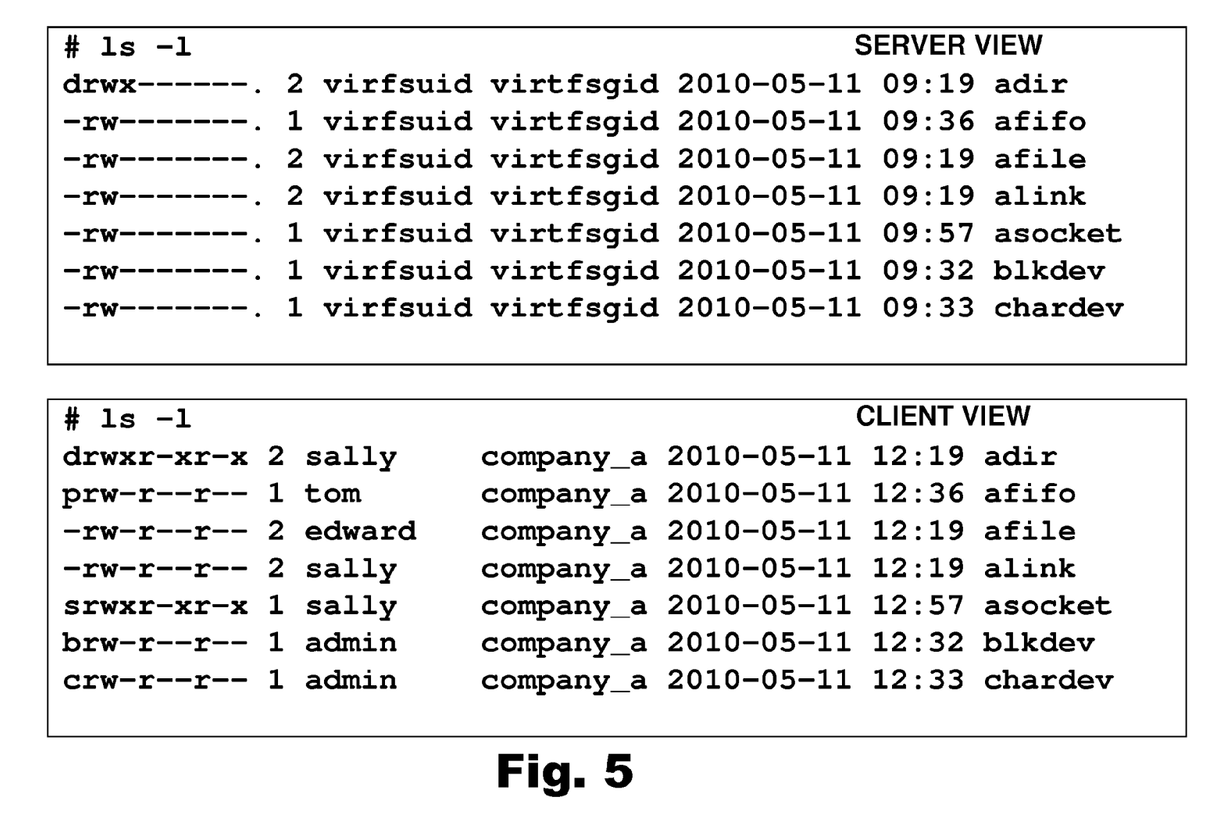
FIG. 5 depicts examples of how an exemplary file server and an exemplary client may treat a set of special files.

FIG. 5 depicts additional examples of how the same computer files may be treated by a network file server (e.g., 200) on one hand and a client (e.g., 220) of the network file server on the other. In the top "server" view, a user of the computer system executing the network file sever has input the command "ls-l," which causes a listing of files in the current working directory to be output, along with access control data and other information about the computer files (e.g., size, date modified). All the files in the directory are stored in association with the user identifier "virfsuid." As noted above, the file server (e.g., 200 in FIG. 3) may be executed using this user identifier, and regardless of who actually created or controls a computer file, the computer file is stored by the network file server under the "virfsuid" user identifier.

Other than the computer file entitled "adir," which is a directory, all the computer files in the top server view of FIG. 5 are regular computer files, as indicated by the lack of a character immediately preceding the read/write/execute bits. However, as suggested by the filenames, most of these computer files actually represent special files, include a FIFO ("afifo"), a symbolic link ("alink"), a socket ("asocket"), a block device ("blkdev"; e.g., CD-ROM, hard disk, memory regions) and a character device (e.g., mice, keyboards, virtual terminals, serial modems). Nonetheless, the network file server treats these files as regular computer files, and as noted above, stores an indicator of the resource represented by the special computer file in extended attributes of the corresponding regular computer file.

In the bottom "client" view of FIG. 5, a user of a second computer system executing a client of the network file server has input the same command, "ls-l," to cause computer file information for the current working directory to be output. The current working directory contains the same computer files that were contained in the directory in the server view. However, instead of being associated with the user identifier "virfsuid," the files now are treated as being owned by users associated with various user identifiers (e.g., Sally, Tom, Edward, admin). Additionally, the computer files that are special computer files (i.e., sockets, symbolic links, FIFOs) are treated as such at the client, as demonstrated by the character (e.g., "p," s," "b," "c") immediately preceding the read/write/execute bits for each special file.

Figure 6:
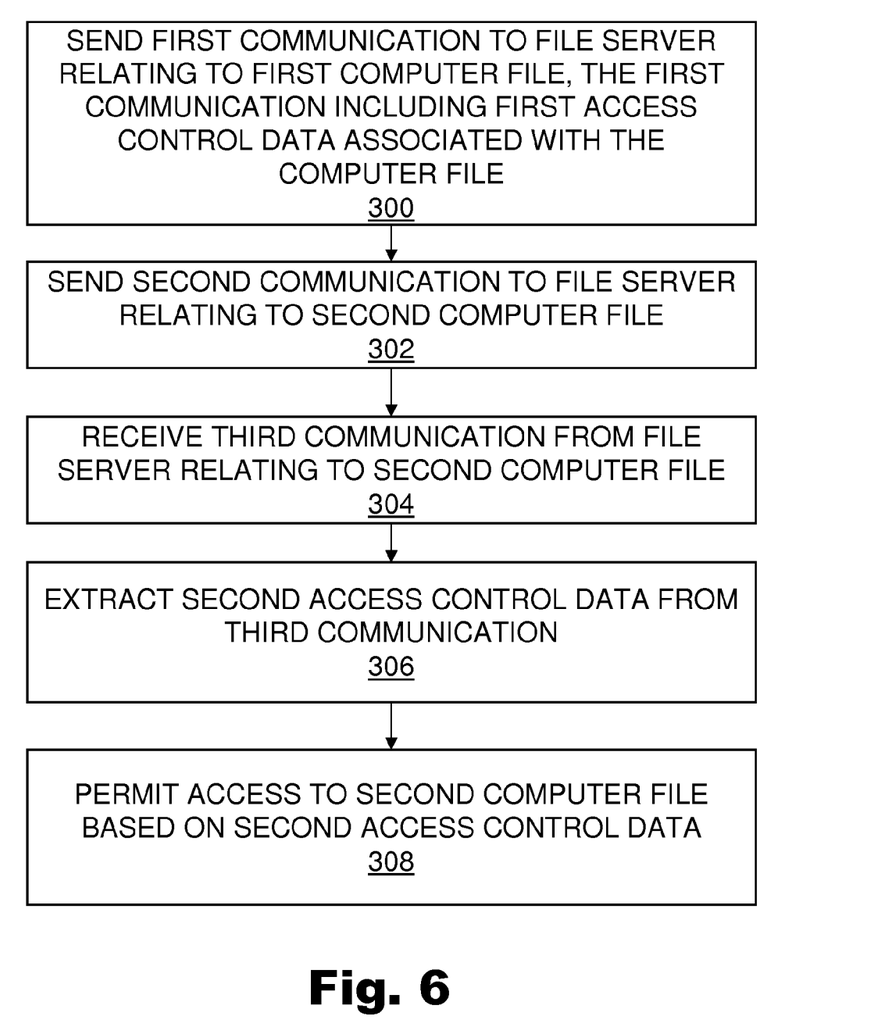
FIG. 6 depicts an exemplary method of permitting access to a remote computer file at a network file system client.
Figure 7:
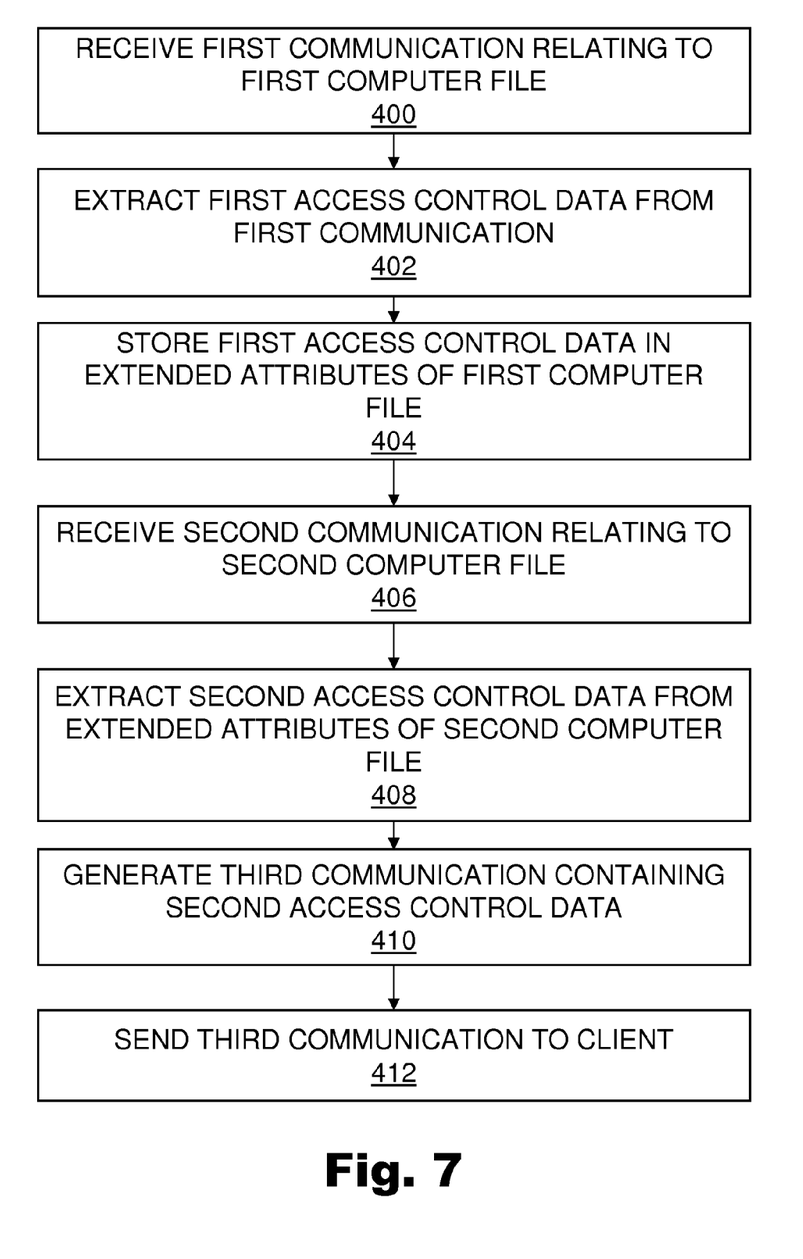
FIG. 7 depicts an exemplary method, executable by a network file server, of making a computer file available over a computer network to a client performing the method of FIG. 6.

The method of FIG. 2 includes actions that are performed by both a network file server (e.g., 100, 102, 104, 106, 110, 112) as well as a network file system client (e.g., 108). FIGS. 6 and 7 depict exemplary methods similar to that shown in FIG. 2, except from the perspectives of a network file system client (e.g., 220) and a network file server (e.g., 200), respectively.

At 300 of FIG. 6, the network file system client sends a first communication relating to a first computer file to the file server. A communication is "related" to a computer file where the communication includes all or a portion of the computer file, refers to the computer file, includes access control data for the computer file, seeks access to a computer file (e.g., read, write, execute), and so forth. The first communication may include first access control data associated with the first computer file. For example, if a user of the computer system upon which the client executes wishes to store or create a first computer file on a network file server, the user may send a communication that includes access control data relating the user to the first computer file, as well as the first computer file itself. Then, as was discussed above, the network file server may store the first computer file in association with the same user identifier as it stores other computer files from other users. The file server also may store, in extended attributes of the first computer file, the access control data included by the client in the first communication.

In addition to storing or creating computer files on a remote computer system, a network file system client may be able to access existing computer files on a remote computer system. For example, at 302 of FIG. 6, the client sends a second communication to the file server relating to a second, existing computer file. This communication may include a request to alter, read, execute or otherwise access the second computer file. At 304, the client receives a third communication from the file server relating to the second computer file. The third communication may include access control data associated with the second computer file. The client may then extract the second access control data from the third communication at 306, and may permit access to the second computer file based on the extracted access control data at 308.

FIG. 7 depicts an exemplary method similar to that shown in FIG. 2, except from the perspective of a network file server (e.g., 200 in FIG. 2). The actions of FIG. 7 respond to and correspond with the actions shown in FIG. 6. At 400, the network file server receives the first communication relating to the first computer file from the client. At 402, the network file server extracts first access control data from the first communication and stores it in extended attributes of the first computer file at 404, as described above.

At 406, the file server receives the second communication from the client relating to the second computer file that already exists on the computer system upon which the filer server executes. As noted above this communication may include a request to alter, read, execute or otherwise access the second computer file. At 408, the file server extracts second access control data from extended attributes of the second computer file and generates the third communication relating to the second computer file and containing the second access control data at 410. At 412, the file server sends the third communication to the client, so that the client may determine whether access to the second computer file is permitted (at 308).

The flowchart and cluster diagrams in the Figures illustrate the architecture, functionality, and operation of possible implementations of systems, methods and computer program products according to various embodiments of the present invention. In this regard, each cluster in the flowchart or cluster diagrams may represent a module, segment, or portion of code, which comprises one or more executable instructions for implementing the specified logical function(s). It should also be noted that, in some alternative implementations, the functions noted in the cluster may occur out of the order noted in the figures. For example, two clusters shown in succession may, in fact, be executed substantially concurrently, or the clusters may sometimes be executed in the reverse order, depending upon the functionality involved. It will also be noted that each cluster of the cluster diagrams and/or flowchart illustration, and combinations of clusters in the cluster diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or clusters thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A system comprising:
a plurality of client computers;
a file server communicatively connected to the client computers and storing a plurality of computer files under a same user identifier in standard file attributes of the computer files, and storing access control data of the computer files in extended attributes of the computer files, wherein each client computer stores thereon local copies of the computer files received from the file server by extracting the access control data thereof and storing the access control data in the standard file attributes of the computer files, wherein the access control data of the computer files is provided by the client computers such that access to the computer files by the client computers is controlled by the client computers and not by the file server, wherein the file server is to:
receive a first communication from a first client computer of the client computers relating to a given computer file of the computer files;
extract the access control data from the extended attributes of the given computer file;
generate a second communication containing the access control data; and
send the second communication to a second client computer of the client computers, and wherein the second client computer is to:
receive the second communication;
extract the access control data from the second communication; and
permit access to the given computer file by the first client computer based on the access control data.

2. The system of claim 1, wherein the file server executes as a user associated with the same user identifier.

3. The system of claim 1, wherein the file server executes as an unprivileged process.

4. The system of claim 1, wherein the file server is configured to:
create a regular computer file of the computer files corresponding to a special computer file;
store in the extended attributes of the regular computer file an indicator of a resource represented by the special computer file.

5. The system of claim 4, wherein the resource represented by the special computer file is one of a device, a symbolic link and a socket.

6. The system of claim 4, wherein the special computer file is treated by the file server as the regular computer file and by each client computer device as the special computer file.

7. The system of claim 6, wherein the special computer file is a symbolic link, and the file server is configured to include in the regular computer file a target location of the symbolic link.

8. A computer program product for providing access to a plurality of computer files over a computer network including a plurality of client computers and a file server, the computer program product including a storage device storing computer-executable code executed by the file server to:
store the computer files under a same user identifier in standard file attributes of the computer files, and store access control data of the computer files in extended attributes of the computer files,
wherein each client computer stores thereon local copies of the computer files received from the file server by extracting the access control data thereof and storing the access control data in the standard file attributes of the computer files,
wherein the access control data of the computer files is provided by the client computers such that access to the computer files by the client computers is controlled by the client computers and not by the file server;
receive a first communication from a first client computer of the client computers relating to a given computer file of the computer files;
extract the access control data from the extended attributes of the given computer file;
generate a second communication containing the access control data; and
send the second communication to a second client computer of the client computers,
wherein the second client computer is to receive the second communication, extract the access control data from the second communication, permit access to the given computer file by the first client computer based on the access control data.

9. The computer program product of claim 8, wherein the file server executes the computer-executable code as a user associated with the same user identifier.

10. The computer program product of claim 8, wherein the file server executes the computer-executable code as an unprivileged process.

11. The computer program product of claim 8, wherein the computer-executable code is further executed by the file server to:
create a regular computer file of the computer files corresponding to a special computer file;
store in the extended attributes of the regular computer file an indicator of a resource represented by the special computer file.

12. A computer program product for providing access to a plurality of computer files over a computer network including a plurality of client computers and a file server, the computer program product including a storage device storing computer-executable code executed by each client computer to:
store local copies of the computer files received from the file server by extracting access control data of the computer files and storing the access control data in standard file attributes of the computer files,
provide the access control data of the computer files such that access to the computer files by the client computers is controlled by the client computers and not by the file server,
wherein the file server stores the computer files under a same user identifier in the standard file attributes of the computer files, and stores the access control data of the computer files in extended attributes of the computer files;
wherein the file server receives a first communication from a first client computer of the client computers relating to a given computer file of the computer files, extracts the access control data from the extended attributes of the given computer file, generates a second communication containing the access control data, and sends the second communication to a second client computer of the client computers,
and wherein the second client computer is to receive the second communication, extract the access control data from the second communication, and permit access to the given computer file by the first client computer based on the access control data.

* * * * *